US006035337A

United States Patent [19]

Redpath et al.

[11] Patent Number: 6,035,337

[45] Date of Patent: Mar. 7, 2000

[54] METHOD AND SYSTEM FOR MANAGING DATA FLOW WITHIN A COLLABORATION SYSTEM USING PROXIMITY DETERMINATION MODULES

[75] Inventors: Richard J. Redpath, Cary; Sandeep Kishan Singhal, Raleigh, both of N.C.

[73] Assignee: International Business Machines Corp., Armonk, N.Y.

[21] Appl. No.: 08/866,632

[22] Filed: May 30, 1997

[51] Int. Cl.[7] .................................................... G06F 13/00
[52] U.S. Cl. ......................... 709/234; 709/206; 370/270
[58] Field of Search ........................ 395/200.33, 200.34, 395/200.49, 200.46, 200.47, 200.71; 345/329; 709/201, 202, 203, 204, 205, 206, 207, 245, 230, 232, 234, 105; 370/260, 265, 266, 267, 270

[56] References Cited

U.S. PATENT DOCUMENTS

| 5,392,400 | 2/1995 | Berkowitz | 395/200.33 |
|---|---|---|---|
| 5,734,984 | 3/1998 | Reece et al. | 455/458 |
| 5,774,668 | 6/1998 | Choquier et al. | 709/203 |
| 5,793,365 | 8/1998 | Tang | 345/329 |
| 5,799,151 | 8/1998 | Hoffer | 395/200.34 |
| 5,832,229 | 11/1998 | Tomoda et al. | 709/206 |
| 5,844,553 | 12/1998 | Hao | 345/329 |

OTHER PUBLICATIONS

Dennis Cronin "MUD Games on the Internet", Dr. Dobb's Journal 1994—CD–ROM (8 pages).

Yu–Shen Ng"Internet Game Design" Gamasutra Special Report, Aug. 1, 1997. Online: Internet—http://www.gamasutra.com/features/special/online_report/homepage.htm.

*Primary Examiner*—Dung C. Dinh
*Attorney, Agent, or Firm*—A. Bruce Clay; Myers, Bigel, Sibley & Sajovec, P.A.

[57] ABSTRACT

Applications are enabled to provide information about which hosts should receive data generated by each host in a collaborative system. The data flow information is enabled, and the way that data flows is calculated to be dynamically changed during the application's execution. This data flow customization is enabled within a generic communication infrastructure. The application's specification of the data distribution is decoupled from the low-level mechanisms used to actually disseminate data across the network.

27 Claims, 4 Drawing Sheets

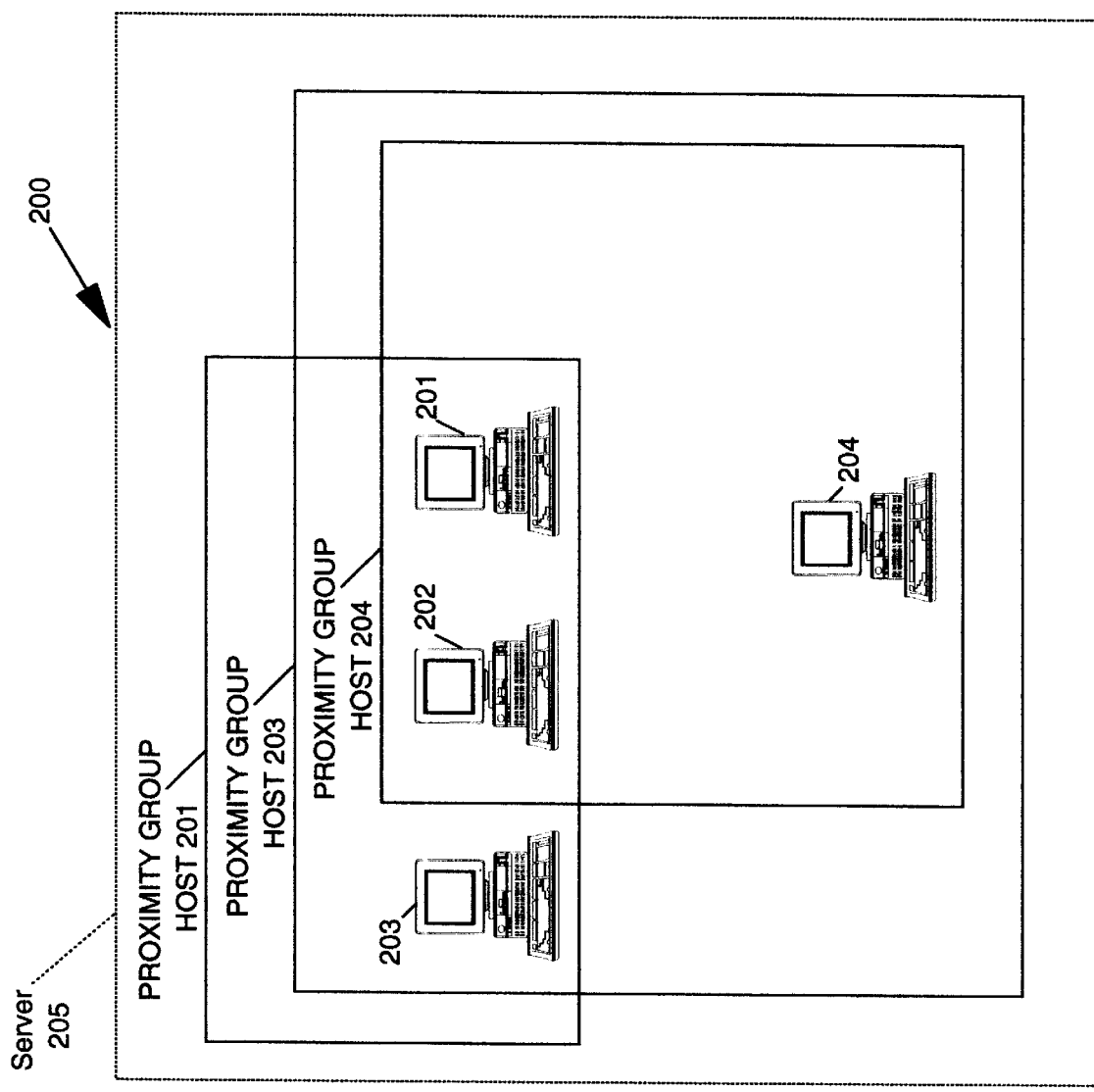

METHOD AND SYSTEM FOR MANAGING DATA FLOW WITHIN A COLLABORATION SYSTEM USING PROXIMITY DETERMINATION MODULES

FIELD OF THE INVENTION

This invention relates in general to computer software, and in particular to a method and system for controlling data flow in a collaboration system. More particularly, the present invention relates to a method and system by which applications can customize the distribution of information while operating within a generic communications infrastructure.

BACKGROUND OF THE INVENTION

In applications supporting multiple simultaneous collaborating users, exchanging information in broadcast mode (i.e., so that it is sent to all participating users) requires excessive network bandwidth resources and consumes excessive processing overhead on the client hosts. Typically, the distribution of information can be restricted only to those recipients who would be interested in receiving that data.

Applications typically have different models for what constitutes "interest." For instance, in a 3-D virtual environment, interest is defined by the set of users who are located within a particular radius of the transmitting user within the virtual world. In a game, interest might be defined by the set of users who are located within a particular "room." In a collaborative document editing environment, interest might be defined by the set of users who are currently viewing the portion of the document that is being modified. Finally, in business environments (such as stock quote systems and workflow environments), interest is defined by the types of information generated by the source.

The general-purpose notion of "interest", therefore, has three important characteristics. First, the set of recipients for a data stream generated by a particular host changes dynamically as the data generated by that source changes and as the interests of other users changes. Second, the nature of the data flow distribution cannot be pre-calculated because the types of data cannot necessarily be determined in advance of program execution. For each new type of data, we wish to customize the data flow. Third, interest is not necessarily symmetric. Even though data produced by one host may be of interest to a second host, there is no guarantee that data generated by that second host would be of interest to the first host.

Techniques for managing data interest and data distribution are commonplace but lack the flexibility to support a broad range of applications within a single communication infrastructure. Systems such as NPSNET, PARADISE, and TIBCO assign a multicast group address for each type of data. Potential recipients monitor the available addresses by querying a multicast address server and subscribe to the multicast groups providing data of interest. This approach is limited because it requires a multicast name server, continual monitoring of available groups, and continual adjustment of subscription patterns. Introducing new types of data is expensive due to the high overhead cost associated with multicast group creation, and there is no facility for security or system management.

Systems such as chat rooms and the NSTP protocol create logical "places" that users may join. All data sent to a place is disseminated automatically to all members of that place. However, this approach does not permit an asymmetric distribution policy within a place.

Finally, systems such as PointCast and Excite provide customized information streams to users based on registered interests. However, these systems are tuned to accept information from a pre-determined set of server-side information sources and, therefore, are less general than our desired systems that support both client-generated and server-generated data.

Thus, there is a need for a common framework for selecting which hosts should receive publicly disseminated data and for allowing particular applications to customize or replace that distribution algorithm.

SUMMARY OF THE INVENTION

An object of the present invention is to enable applications to provide information about which hosts should receive data generated by each host in a collaborative system, in particular, to provide a method to customize or replace the distribution algorithm.

Another object of the present invention is to enable the way that data flows are calculated to be changed dynamically during the application's execution.

Yet another object of the present invention is to enable this data flow customization within a generic communication infrastructure.

Still yet another object of the present invention is to decouple the application's specification of the data distribution from the low-level mechanisms used to actually disseminate data across the network.

To achieve the foregoing objects and in accordance with the purpose of the invention as broadly described herein, a method and system are disclosed for using pluggable Proximity Determination Modules to specify the data distribution within a collaborative application. These and other features, aspects, and advantages of the present invention will become better understood with reference to the following description, appended claims, and accompanying drawings.

BRIEF DESCRIPTION OF THE DRAWINGS

For a more complete understanding of the present invention and for further advantages thereof, reference is now made to the following Detailed Description taken in conjunction with the accompanying drawings, in which:

FIGS. 2A and 2B show a data distribution system in which each host transmits data to a Proximity Group.

DETAILED DESCRIPTION OF THE INVENTION

Figure 1:
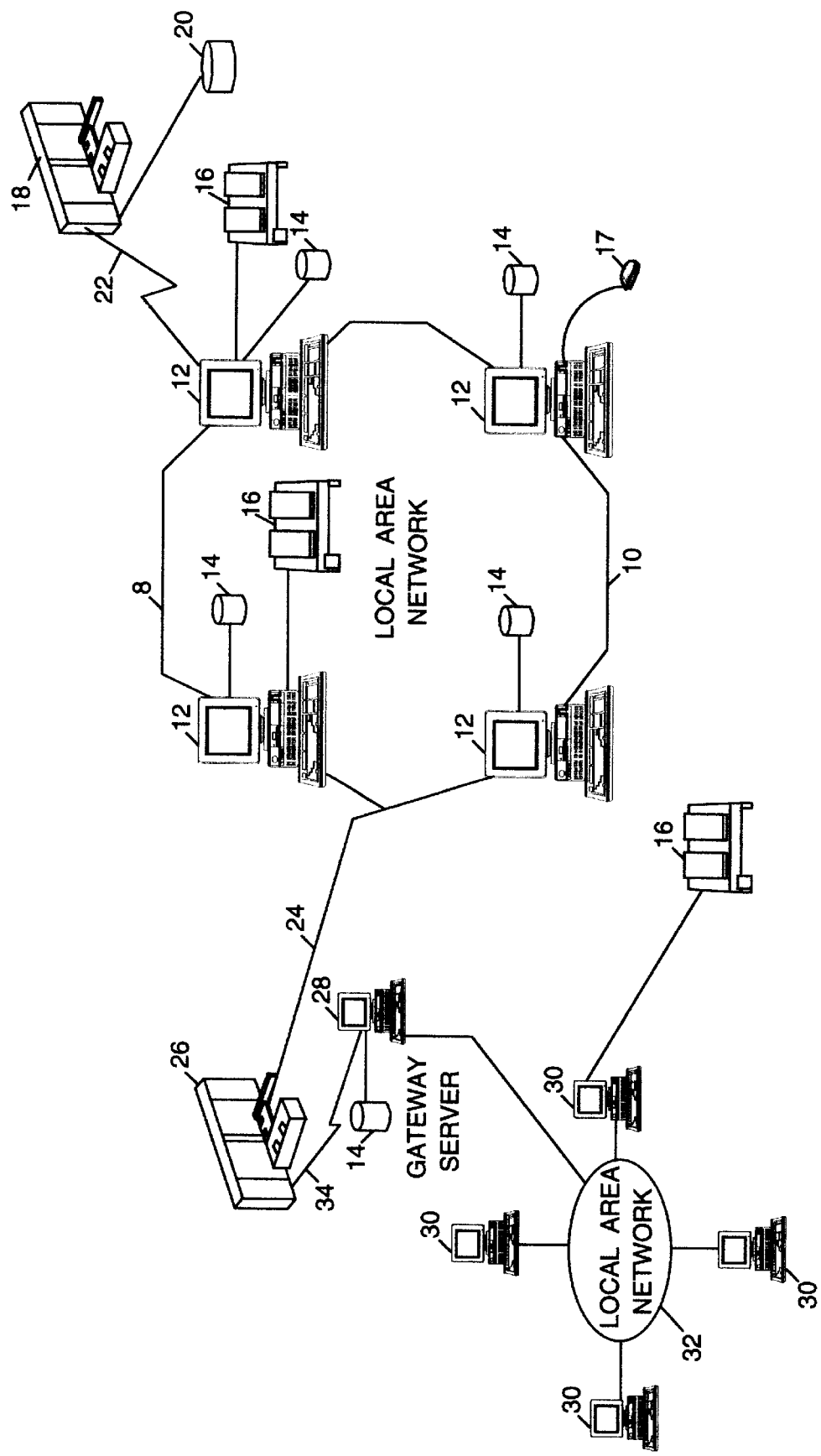
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

A communications infrastructure allows an application to transmit data to a Proximity Group, which represents a set of destinations that need/desire information generated by a source host. When data is sent to the Proximity Group, the communications infrastructure ensures that it is sent to the appropriate set of destinations. In the preferred embodiment of the present invention, the Proximity Group is provided along with other group types such as a Broadcast Group (for broadcasting data to all hosts), an Individual Group (for sending data to a single host), and a Private Group (for sending data to a specific subset of hosts).

Figure 2A:
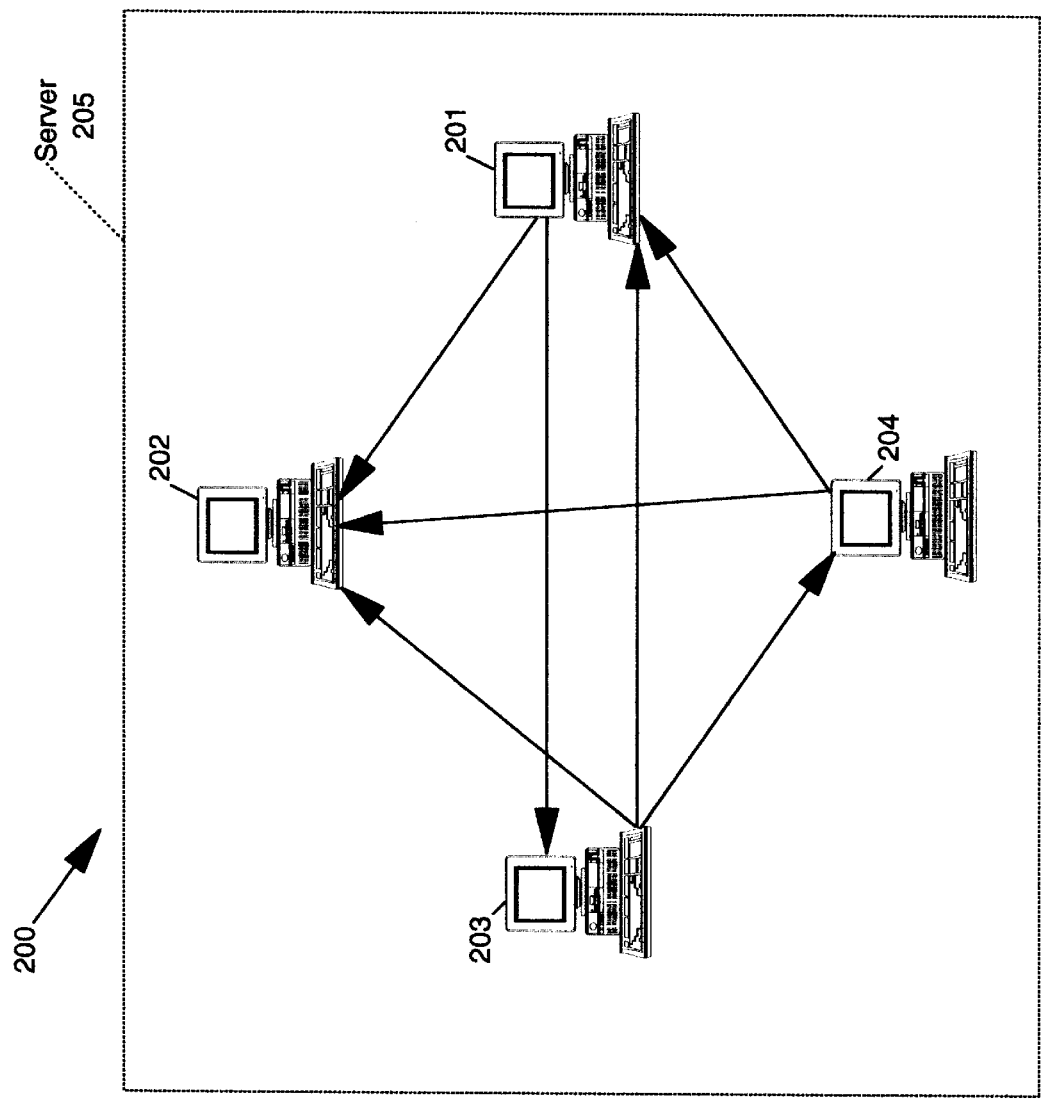

Referring now to FIG. 2A, an instantaneous state of a multi-user collaborative application system, generally identified by reference numeral 200, containing hosts 201, 202, 203, and 204 is shown. The system 200 is managed by a server 205. Within this system 200, data generated by host 201 is desired/required by hosts 202 and 203 but not by host 204. Consequently, the Proximity Group for host 201 contains hosts 202 and 203 (see FIG. 2B). Similarly, host 203 provides data for hosts 201, 202, and 204, so host 203's Proximity Group (see FIG. 2B) includes hosts 201, 202, and 204. Finally, host 204 provides data for hosts 201 and 202, and its Proximity Group consequently contains these two hosts (FIG. 2B). We see that the data distribution is asymmetric, in that although data from host 203 is sent to host 204, data from host 204 is not sent to host 203 (see FIG. 2A). Depending on the particular communication infrastructure used, the server host 205 may or may not receive data sent by hosts 201, 202, 203, or 204. Moreover, although not shown in FIGS. 2A and 2B, it is to be understood that the server function (designated by server 205) may be co-located with one of the user hosts 201, 202, 203, or 204.

The application running on the collaboration server (server 205 in FIGS. 2A and 2B) implements a Proximity Determination Module (PDM) that provides dynamic information about how data should flow within the collaborative application. In the preferred embodiment of this invention, the PDM is a class that implements a pre-specified interface in the Java programming language, as follows:

```
interface ProximityDeterminator
{
        // Notify the PDM that a new user or host should be tracked
    void newUser(UserDescription user);
        // Notify the PDM that a user should no longer be tracked
    void deleteUser(UserDescription user);
        // Query whether user2 belongs in user1's Proximity Group.
    boolean proximityTest(UserDescription user1,
            UserDescription user2);
        // Update proximity map for data sent by user to a set of
        // identified users. The mapping parameter is a bit array
        // whose O'th row describes the current proximity map
        // (1 = in Proximity Group, 0 = not in Proximity Group) for each user.
        // The PDM modifies the mapping to signal whether each user should
        // be added or removed from the current proximity map. The
        // function returns the number of elements modified in the
        // mapping array.
    int proximityUpdate(UserDescription user,
            UserDescription [] users,
            int [3][] mapping);
}
```

The PDM's methods allow the server to query for information about the current Proximity Group relationships among users participating in the collaborative application. The UserDescription contains state information about each user. The PDM implementation is responsible for obtaining additional necessary information, which may involve querying the server, directly communicating with the client, accessing a database, etc.

PDM's may implement a variety of data distribution models. A "Cartesian" PDM might, for example, determine Proximity using distance between virtual user position, as obtained during the execution of the application. A "Room"

PDM might determine Proximity based on user location within a particular room and the interconnection structure between those rooms. Users enter these rooms by explicit subscription messages to the PDM.

The collaboration server exposes an application programming interface (API) through which the application can install a PDM, as follows:

```
// Install a new PDM
void setProximityDeterminator(ProximityDeterminator pdm);
    // Retrieve the currently installed PDM
ProximityDeterminator getProximityDeterminator();
```

This interface allows arbitrary PDM's to be installed and customized by the application. Furthermore, the PDM can be changed dynamically as the server is running (e.g. in response to CPU/bandwidth demands, number of users, etc.). In the preferred embodiment of this invention, the server installs a default PDM that places each participant in every Proximity Group (e.g. by simply returning true from the proximityTest( ) function), thereby simulating a simple broadcast system.

To maintain Proximity Group information about all users, the server periodically queries the installed PDM for up-to-date proximity information. Based on this information, the server updates distribution lists for each user and enables the corresponding data flows over the network. The PDM can also post a request to the server to update proximity information.

Figure 3:
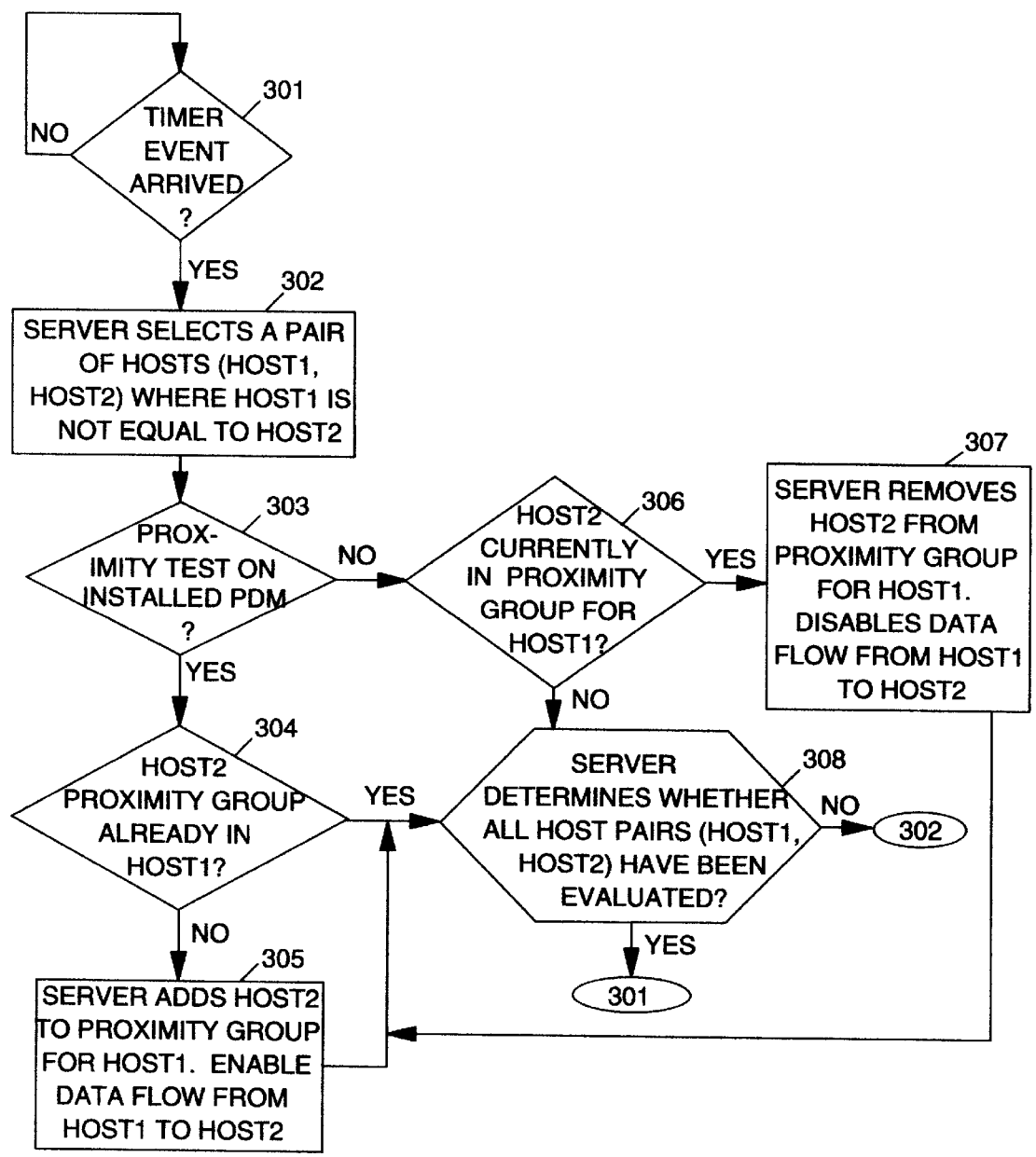
FIG. 3 depicts a flowchart showing how the server uses a Proximity Determination Module (PDM) to maintain Proximity Group information.

Referring now to FIG. 3, a flow chart depicts how the server maintains data distribution information for all participating hosts. The server sets an alarm timer to send a periodic event notification. In the preferred embodiment of the present invention, the alarm is triggered once every five seconds. In decision block 301, the server determines whether a timer event has arrived. If the answer to decision block 301 is no, then control returns to decision block 301. Otherwise, if the answer to decision block 301 is yes, then at block 302, the server selects a pair of hosts (Host1, Host2) where Host1 is not equal to Host2. At decision block 303, the server calls the proximityTest( ) method on the installed PDM. If the answer to decision block 303 is yes, then at decision block 304, the server determines whether Host2 is already in the ProximityGroup for Host1. If the answer to decision block 304 is no, then at block 305, the server adds Host2 to the ProximityGroup for Host1 and enables the data flow from Host1 to Host 2. After block 305, or if the answer to decision block 304 is yes, control passes to block 308.

Continuing in FIG. 3, if the answer to decision block 303 is no, then at decision block 306, the server determines whether Host2 is currently in the ProximityGroup for Host1. If the answer to decision block 306 is yes, then at block 307, the server removes Host2 from the ProximityGroup for Host1 and disables the data flow from Host1 to Host 2. After block 307, or if the answer to decision block 306 is no, control passes to block 308.

Continuing in FIG. 3, at decision block 308, the server determines whether all host pairs (Host1,Host2) have been evaluated. If the answer to decision block 308 is no, then control returns to block 302, as previously described above. If the answer to decision block 308 is yes, then control returns to block 301, as previously described above.

Although not shown in FIG. 3, alternative embodiments of this invention can process multiple host pairs through a single call to the PDM by invoking the proximityUpdate( ) function in the PDM.

The collaboration server is free to use any appropriate method for enabling and disabling communication flows for client Proximity Groups. These techniques are well-documented in the prior art and, therefore, are not claimed as part of the present invention. For example, the collaboration infrastructure may use explicit distribution lists at each client host, multicast group addresses, or proxy data distribution via the server host.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of managing information flow in a collaborative application, comprising the steps of:

installing a Proximity Determination Module on a host server wherein the Proximity Determination Module determines which ones of a plurality of application hosts are in a Proximity Group associated with the collaborative application;

utilizing the Proximity Determination Module to determine which ones of the plurality of application hosts are in a first Proximity Group associated with a first of the plurality of application hosts;

utilizing the Proximity Determination Module to determine which ones of the plurality of application hosts are in a second Proximity Group associated with a second of the plurality of application hosts different from the first application host; and periodically invoking said Proximity Determination Module to obtain updated Proximity Group information about at least one of the first and second application hosts.

2. The method of claim 1, wherein said Proximity Determination Module implements a particular interface.

3. The method of claim 2, wherein said interface includes a function for specifying presence of a new host in said collaboration application.

4. The method of claim 2, wherein said interface includes a function for specifying departure of an existing host from said collaboration application.

5. The method of claim 2, wherein said interface includes a function for querying whether a first host belongs to a Proximity Group for a second host.

6. The method of claim 2, wherein said interface includes a function for querying for changes to said Proximity Group information for a host.

7. The method of claim 1, wherein said step of invoking said Proximity Determination Module is performed periodically in response to a timer event.

8. The method of claim 1, further comprising the step of:

initiating changes to data distribution from hosts participating in said collaboration application based on said Proximity Group information obtained from said Proximity Determination Module.

9. The method of claim 1, further comprising the step of:

replacing said Proximity Determination Module during execution of said collaboration application.

10. A system for managing information flow in a collaborative application, comprising:

means for installing a Proximity Determination Module on a host server wherein the Proximity Determination Module determines which ones of a plurality of application hosts are in a Proximity Group associated with the collaborative application;

means for utilizing the Proximity Determination Module to determine which ones of the plurality of application hosts are in a first Proximity Group associated with a first of the plurality of application hosts;

means for utilizing the Proximity Determination Module to determine which ones of the plurality of application hosts are in a second Proximity Group associated with a second of the plurality of application hosts different from the first application host; and means for periodically invoking said Proximity Determination Module to obtain updated Proximity Group information about at least one of the first and second application hosts.

11. The system of claim 10, wherein said Proximity Determination Module implements a particular interface.

12. The system of claim 11, wherein said interface includes a function for specifying presence of a new host in said collaboration application.

13. The system of claim 11, wherein said interface includes a function for specifying departure of an existing host from said collaboration application.

14. The system of claim 11, wherein said interface includes a function for querying whether a first host belongs to a Proximity Group for a second host.

15. The system of claim 11, wherein said interface includes a function for querying for changes to said Proximity Group information for a host.

16. The system of claim 10, wherein said means for invoking said Proximity Determination Module is performed periodically in response to a timer event.

17. The system of claim 10, further comprising:

means for initiating changes to data distribution from hosts participating in said collaboration application based on said Proximity Group information obtained from said Proximity Determination Module.

18. The system of claim 10, further comprising:

means for replacing said Proximity Determination Module during the execution of said collaboration application.

19. A computer program product recorded on computer readable medium for managing information flow in a collaborative application, comprising:

computer readable means for installing a Proximity Determination Module on a host server wherein the Proximity Determination Module determines which ones of a plurality of application hosts are in a Proximity Group associated with the collaborative application;

computer readable means for utilizing the Proximity Determination Module to determine which ones of the plurality of application hosts are in a first Proximity Group associated with a first of the plurality of application hosts;

computer readable means for utilizing the Proximity Determination Module to determine which ones of the plurality of application hosts are in a second Proximity Group associated with a second of the plurality of application hosts different from the first application host; and computer readable means for periodically invoking said Proximity Determination Module to obtain updated Proximity Group information about at least one of the first and second application hosts.

20. The program product of claim 19, wherein said Proximity Determination Module implements a particular interface.

21. The program product of claim 20, wherein said interface includes a function for specifying presence of a new host in said collaboration application.

22. The program product of claim 20, wherein said interface includes a function for specifying departure of an existing host from said collaboration application.

23. The program product of claim 20, wherein said interface includes a function for querying whether a first host belongs to a Proximity Group for a second host.

24. The program product of claim 20, wherein said interface includes a function for querying for changes to said Proximity Group information for a host.

25. The program product of claim 19, wherein said computer readable means for invoking said Proximity Determination Module is performed periodically in response to a timer event.

26. The program product of claim 19, further comprising:

computer readable means for initiating changes to data distribution from hosts participating in said collaboration application based on said Proximity Group information obtained from said Proximity Determination Module.

27. The program product of claim 19, further comprising:

computer readable means for replacing said Proximity Determination Module during execution of said collaboration application.

* * * * *